Sept. 12, 1950  R. A. GILMOUR  2,522,112
LAWN MOWER

Filed May 25, 1948  3 Sheets-Sheet 1

Inventor
ROBERT A. GILMOUR
By Jack R. Snyder
Attorney

Sept. 12, 1950 R. A. GILMOUR 2,522,112
LAWN MOWER
Filed May 25, 1948 3 Sheets-Sheet 2
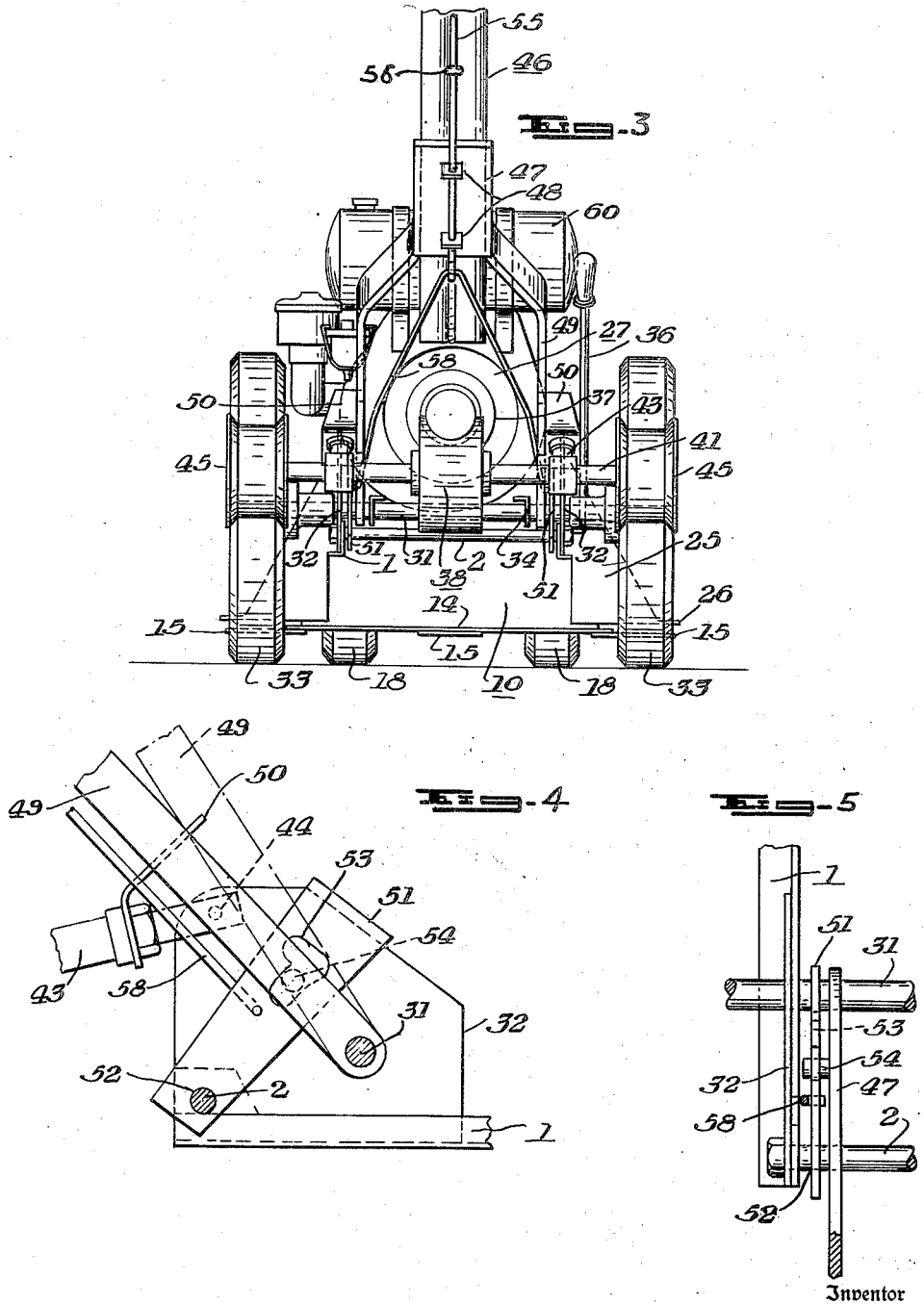
Inventor
ROBERT A. GILMOUR
By Jack R. Snyder
Attorney Sept. 12, 1950    R. A. GILMOUR    2,522,112
LAWN MOWER
Filed May 25, 1948    3 Sheets-Sheet 3
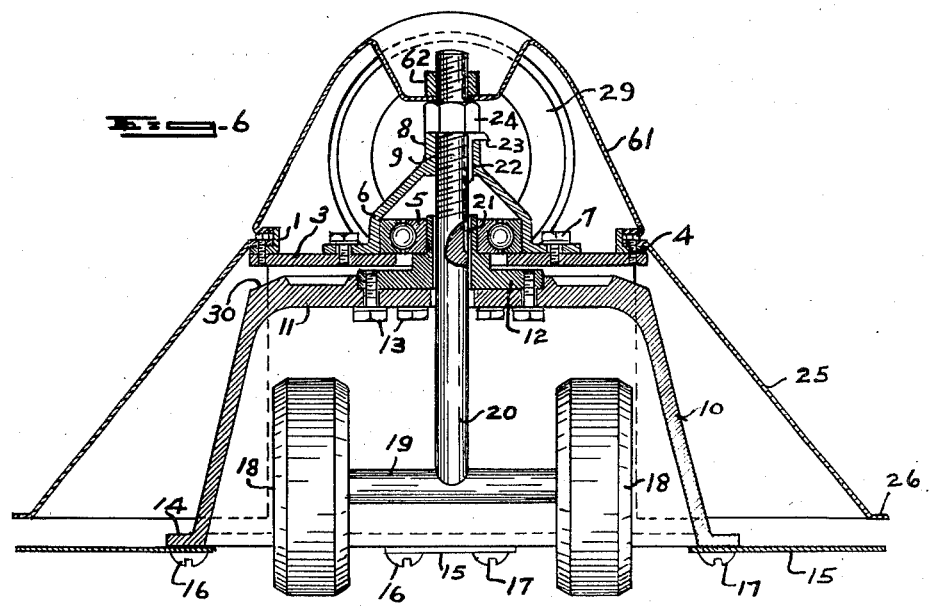
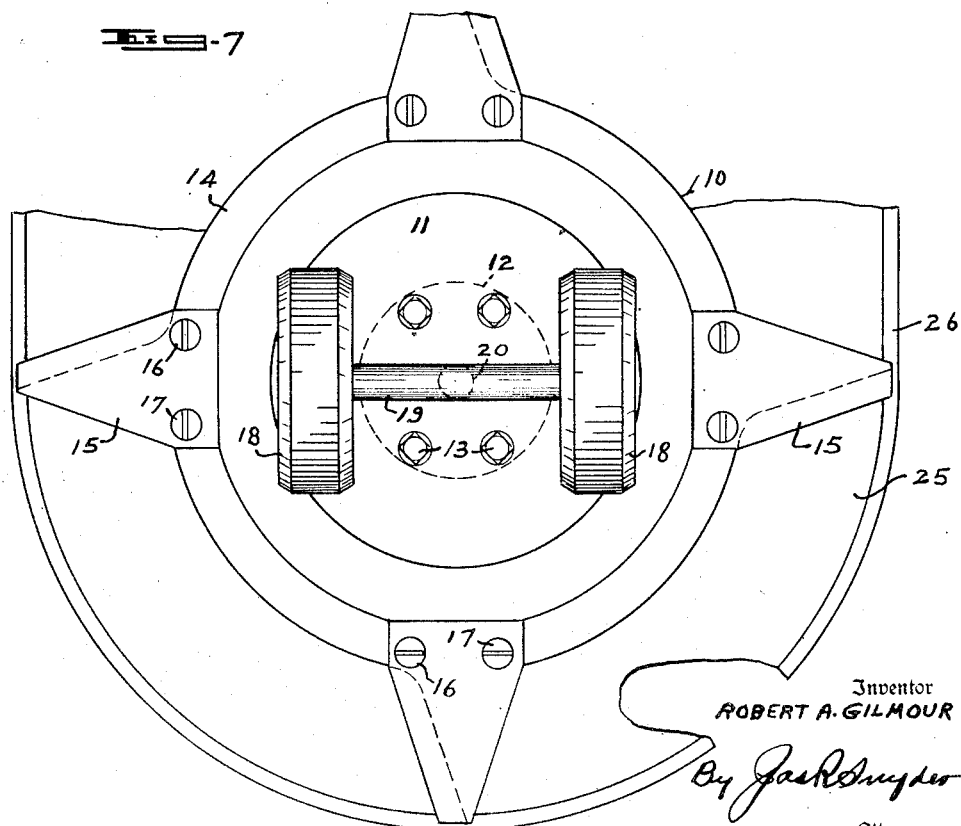
Inventor
ROBERT A. GILMOUR
By Jack R. Snyder
Attorney Patented Sept. 12, 1950

2,522,112

UNITED STATES PATENT OFFICE 2,522,112

LAWN MOWER

Robert A. Gilmour, Somerset, Pa.

Application May 25, 1948, Serial No. 29,184

1 Claim. (Cl. 56—25.4)

This invention relates to an improved lawn mower, and important objects and advantages of the invention are to provide a power-operated lawn mower of the character described, which will function effectively to cleanly cut any type of lawn grasses, which will facilitate lawn mowing operations, which embodies friction driven propulsion and cutter mechanisms, which has adjustable front supporting wheels that are housed within the cutter head to facilitate the control and steering of the mower, which embodies novel means for suspending the operation of the propulsion mechanism and for holding the latter in the inoperative position by the upward movement of the handle, and which functions to mince and shred the grass cuttings into very minute pieces that need not be removed from the mowed lawn and thereby serve as a suitable mulch for the improvement and protection of the lawn.

Further objects of the invention are to provide a lawn mower of the class stated, which may be readily and conveniently operated by anyone of ordinary skill, which is simple in its construction and arrangement, strong, durable and efficient in its use, compact, positive in its action, attractive in appearance, and comparatively economical in its manufacture and operation.

With the foregoing and other objects in view which will appear as the description proceeds, the invention resides in the novel construction, combination, and arrangement of parts herein specifically described and illustrated in the accompanying drawings, but it is to be understood that the latter are merely illustrative of the preferred embodiment of the invention, and that mechanical variations from the embodiment shown may be resorted to if required. It is therefore, not intended to limit the invention to the disclosure thereof herein illustrated, but rather to define such limitations to the scope of the claims hereunto appended.

In the drawings wherein like numerals of reference designate corresponding parts throughout the several views:

Figure 3 is a rear end view of the lawn mower.

Figure 4 is a fragmentary side elevational view of the traction control elements, and Figure 5 is a top plan view of the latter.

Figure 6 is an enlarged vertical cross sectional view of the cutter head and of associated parts.

Figure 7 is a bottom plan view of the cutter head and cover shield.

Figure 1:
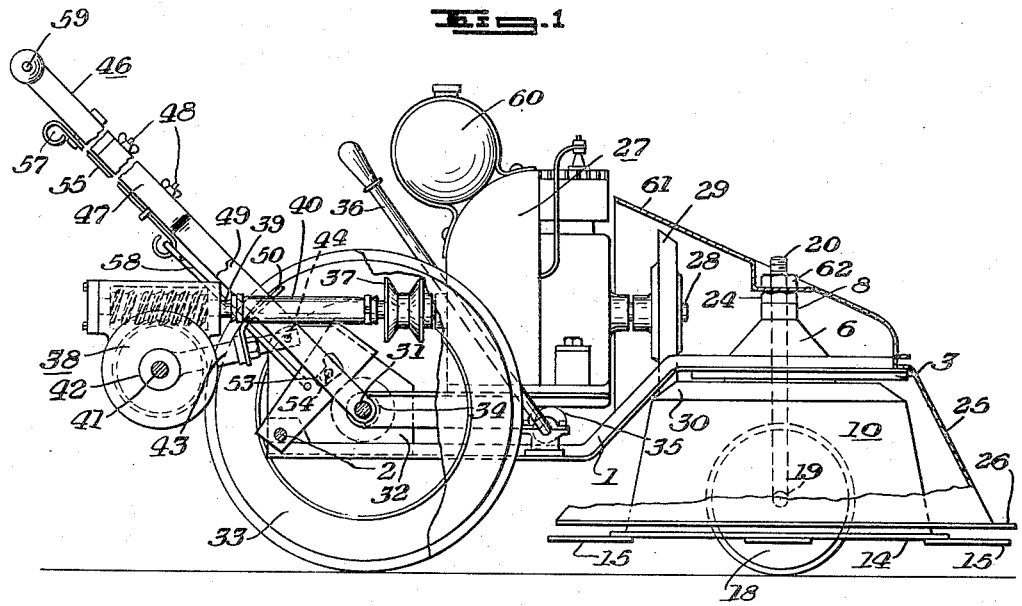
Figure 1 is a side elevational view, partly in section, of a power operated lawn mower, constructed in accordance with the invention.
Figure 2:
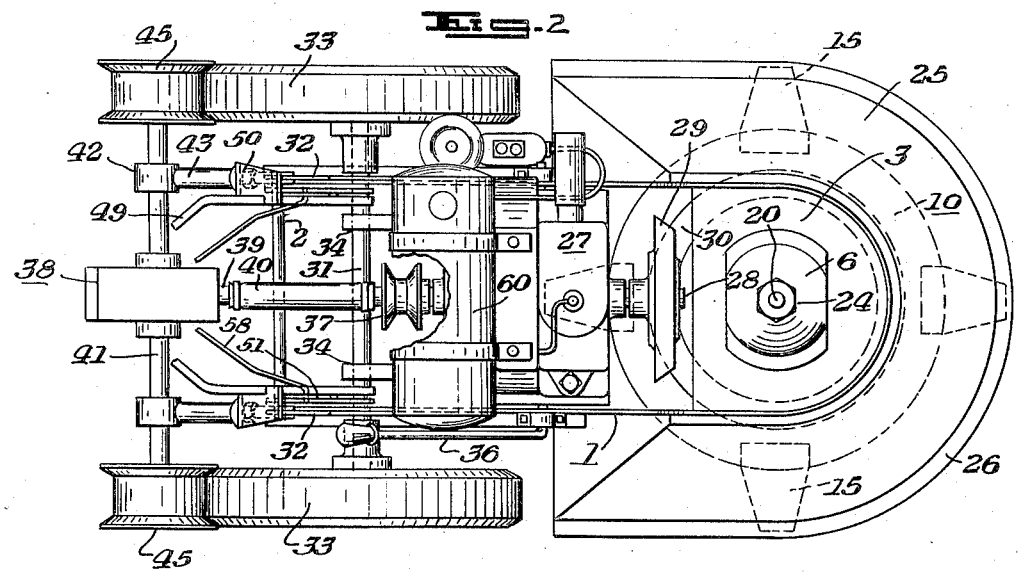
Figure 2 is a top plan view thereof with portions broken away.

Referring in detail to the drawings 1 denotes the frame of the frame structure of the lawn mower. The frame 1 is preferably constructed of structural angle stock, and is substantially U-shaped with the free end portions being disposed horizontally parallel and rearward and below the plane of the horizontal forward end portion thereof.

The frame structure includes a rear cross bar 2, which is rigidly secured to respective rear ends of the frame 1, and a transversely disposed front cross plate 3, which is rigidly secured against the underside of the forward end portion of the frame by means of bolts 4.

A vertically disposed ball bearing 5 is mounted on the top of the front cross plate 3, and is enclosed and maintained in position on the latter by a vertically disposed bearing housing 6. The bearing housing is secured to the cross plate by bolts 7, and converges toward its top or upper end, which latter is formed to provide a centrally disposed hub 8 having a threaded bore 9.

A vertically disposed, circular, hollow cutter head 10, including a top 11 and having an open lower end, is mounted below the front elevated portion of the frame 1, and is revolubly suspended from the ball bearing 5 by means of a flanged tubular bearing member 12. The bearing member has its reduced upper end fixed in the revoluble inner section of the ball bearing, and has its flanged lower end secured centrally to the top 11 of the cutter head 10, by means of bolts 13.

The cutter head is substantially inverted dish shaped with the side wall thereof flaring outwardly from the top 11 toward the lower end, whereby the diameter of said lower end is considerably greater than the diameter of the top 11. The lower end of the cutter head is formed with an annular, outwardly projecting bottom flange 14, which carries the cutting blades 15.

The cutting blades 15 are arranged in diametrically opposed pairs, and project radially outward from the bottom flange 14. Each of the cutting blades is rigidly secured to the bottom flange of the cutter head 10, by a pair of screw bolts, respectively indicated at 16 and 17.

An important feature of the invention is that the screw bolt 16 of each pair of screw bolts securing a cutter blade 15, is constructed of a metal, such as brass, that has a lower shearing or breaking point than the associated screw bolt 17, which latter is preferably made of steel. In the event the cutter blade should strike against any fixed obstruction during mowing operations, the bolt 16 will be sheared off and allow the said cutting blade to shift inwardly to under the cutter head 10. Such shifted cutter blade will not be broken but will still remain attached to the cutter head by the unbroken screw bolt 17, and in consequence such partially detached cutting blade will not be violently cast from the rotating cutter head, as might happen if the cutting blade should become entirely detached from the cutter head.

To facilitate the control and steering of the lawn mower, the pair of front supporting wheels 18 are disposed in the cutter head 10 in a novel manner. The front supporting wheels are of comparatively small diameter, and are revolubly mounted on respective ends of a relatively short front axle 19. A vertically disposed axle stem 20 depends into the cutter head 10, and has the lower end thereof permanently fixed to the center of the front axle 19. The axle stem extends freely through a central opening provided therefor in the cutter head top 11 and through the tubular bearing member 12, and has a threaded upper end portion that is engaged in the bore 9 of the hub 8. By adjusting the axle stem in the hub, the front supporting wheels may be raised or lowered within the cutter head and the latter will be correspondingly elevated or lowered to the required adjusted position determining the height of the grass cutting operation.

The threaded upper portion of the axle stem 20 is provided with a vertically extending key slot 21, which may be cooperatively registered with a keyway 22 in the wall of the bore 9 of the hub 8, for receiving a key 23, whereby the axle stem is secured against rotation and in the adjusted position in the hub 8 and the front supporting wheels 18 are maintained in their proper transversely aligned position in the cutter head 10. A locking nut 24 is engaged on the axle stem and may be set against the upper end of the hub 8 to secure the key 23 in the holding position and generally to stabilize the assembly of the axle stem in the bearing housing 6.

The cutter head 10 is covered by an outwardly flaring cover shield 25, which is carried by and secured to the front portion of the frame 1. The lower end of the cover shield is reenforced by an outwardly projecting flange 26, which is disposed slightly above and projects slightly outward beyond the outer free ends of the cutting blades 15.

As the cover shield 25 is spaced from the cutter head 10, and owing to the spaced position of the shield flange 26 with respect to the cutting blades 15, the grass severing operation is actually effected by the front portion of the cutting blades, but the cut grass is tossed into the space area between the cover shield and cutter head and repeatedly drops into the path of the speedily travelling cutting blades and is thereby cut into minute pieces before finally falling upon the lawn. Due to size of such minced cuttings the latter need not be removed from the lawn as it provides advantageous mulch for the improvement of the lawn.

An operating motor 27, of any suitable conventional internal combustion type, is mounted on the frame 1, and includes a motor shaft 28, which carries a driving pulley 29 that is fixed to the forward end of the motor shaft to turn with the latter. The periphery of the driving pulley is bevelled and is normally frictionally engaged on a correspondingly bevelled rim track 30, which latter is formed on and extends around the edge margin of the top surface of the top 11 of the cutter head 10. The rotation of the driving pulley imparts rotation to the cutter head. Due to the flared construction of the cutter head, the latter will cut a comparatively wide swath, while the proper speed of the cutter head is attained by the relatively small diameter of the rim track on the cutter head.

A transversely extending rear axle 31 is fixed in a pair of vertically disposed side plates 32, which are secured to respective rear ends of the frame 1. A pair of comparatively large rubber-tired traction wheels 33 are revolubly mounted on respective ends of the rear axle 31, and support the rear end of the mower.

The rear end of the base of the motor 27 has a pivotal connection with the rear axle 31, as indicated at 34, and such connection provides the only support for the rear end of the motor. During mowing operations, the driving pulley 29 is engaged on the track rim 30 of the cutter head 10 and supports the entire weight of the front end of the motor.

As the entire weight of the front end of the motor 27 is imposed by the driving pulley 29 upon the cutter head 10, as above stated, ample friction is provided to assure positive rotation of the cutter head by the driving pulley under all ordinary mowing conditions. However, it will be obvious that some slippage of the driving pulley on the cutter head can occur, before breakage of any vital part of the mower or the stalling of the motor, in the event the cutter head is suddenly locked against rotation by the striking of the cutting blades 15 against some fixed obstruction or the like.

A suitable cam mechanism 35, including an operating lever 36, is pivotally mounted on the frame 1 beneath the front end of the motor 27. The cam mechanism is operable to slightly raise the front end of the motor and thereby elevate the driving pulley 29 to clear the cutter head 10 to suspend the rotation of the latter, even if the motor is still running. When the mower is not in use in actual mowing operations, the front end of the motor should, of course, be supported by the cam mechanism, to relieve the suspended cutter head from sustaining such weight.

A starter pulley 37, of the conventional ratchet-controlled type, is mounted on the motor shaft 28 rearwardly of the motor 27, and is employed in the well known manner for initially starting the latter.

Travel propulsion for the mower is provided by a worm and worm wheel gear transmission 38. The worm is provided with a drive shaft 39, which is normally longitudinally aligned with the motor shaft 28 and operatively connected with the latter by a flexible sleeve coupling 40. The coupling preferably comprises a suitable length of substantial rubber hose having its respective ends secured, in any suitable manner, to the adjacent ends of the drive shaft 39 and the motor shaft 28.

A transversely extending drive axle 41 is fixed in the worm wheel of the gear transmission 38, to rotate with said worm wheel. The drive axle is suitably journalled for rotation in a pair of shiftable bearings 42. Each of the bearings 42 is carried at the outer end of a supporting arm 43, which latter has its inner end pivotally connected, as at 44, with respective side plates of the frame structure of the mower.

A pair of friction spools 45 are fixed to respective ends of the drive axle 41 to rotate with the latter. The friction spools normally ride frictionally against the periphery of respective traction wheels 33, and impart rotation to the latter to provide travel propulsion to the mower at the required mowing speed.

Although the propulsion mechanism, that is, the gear transmission 38, the drive axle 41, the bearings 42, and the friction spools 45, is of sufficient weight to provide the necessary friction to cause the friction spools to impart rotation to the traction wheels 33 under ordinary mowing conditions, such friction may be increased by the manipulation of the mover handle 46, to meet any condition found in practice, in the manner to be described.

When the driving pulley 29 is frictionally engaged in the driving position on the cutter head 10, and the friction spools 45 are likewise engaged in the driving positions on the traction wheels 33, the motor shaft 28, the flexible coupling 40, and the drive shaft 39, are preferably in exact longitudinal alignment. When the driving pulley 29 is elevated to clear and suspend the operation of the cutter head by the operation of the cam mechanism 35, the coupling 40 will be but slightly flexed, and thus allow the continued independent operation of the propulsion mechanism without any untoward mechanical results. In like manner, if the friction spools are slightly elevated to clear the traction to suspend travel propulsion, in the manner to be described, the resultant slight flexure of the coupling will in no way interfere with the continued inoperative drive of the propulsion mechanism.

The mower handle 46, preferably comprising a pair of paralleled disposed pipes welded together, extends rearwardly from the mower at about the usual angle from the vertical. The handle has its lower end adjustably secured in the upper end of a handle yoke 47 by means of bolts 48, to allow the adjustment of the handle to best adapt the latter to the height of the operator. The yoke 47 includes a pair of spread yoke arms 49, which have the lower free ends thereof pivotally connected with the rear axle 31 adjacent to respective side plates 32 of the frame structure.

A lifter leg 50 is suitably connected with each of the bearing supporting arms 43 and with respective yoke arms 49, so that when the handle 46 is raised the entire propulsion mechanism will be elevated sufficiently to cause the friction spools 45 to clear the traction wheels 33, and thereby suspend the travel of the mower.

A latching plate 51 is disposed adjacent to the inner side of each of the side plates 32, and has its outer rear end pivotally connected, as at 52, to the frame structure. Each of the latching plates is formed with a substantially L-shaped slot 53, which is disposed adjacent to the free inner end thereof. A stud 54 is fixed in each of the yoke arms 49 and projects laterally outward from the latter and is shiftably engaged in the slot 53 of respective latching plates 51.

When the studs are engaged in the rearwardly disposed portions of the slots 53, the propulsion mechanism will be in the operative position with the friction spools 45 in engagement with the traction wheels 33. However, when the studs are engaged in the upwardly disposed portions of the slots 53, the propulsion mechanism is in the elevated inoperative position and is held in such inoperative position by such engagement.

It will here be noted that in raising the handle 46 the studs 54 will shift from the rearwardly disposed portions of the slots 53 into the upwardly disposed portions of the latter, and the forward free ends of the latching plates 51 will then drop automatically by gravity action to cause the full latching engagement of the studs in said upwardly disposed portions of the slots 53. Such full latching engagement will hold the propulsion mechanism in the elevated inoperative position until the latching plates are raised to shift the upwardly disposed portions of the slots from their engagement with the studs. It is, of course, apparent that the engagement of the studs in the slots 53 limits the raising movement of the handle on its pivotal connection, through the yoke 47, with the rear axle 31.

A release rod 55 extends along the underside of the handle 46 and is mounted for longitudinal movement in supporting eyes 56 which are fixed in the handle. The free outer end of the release rod is formed with a pull ring 57, and the lower end thereof includes a fork 58. The lower ends of the fork are pivotally joined with respective latching plates 51 adjacent to the forward free ends of the latter. It will be seen that the release rod must be manually operated to effect the release of the latching plates from the studs 54 to allow the shifting of the propulsion mechanism by gravity into the lowered operative position with the friction spools 45 in engagement with the traction wheels 33.

The upper end of the handle 46 is provided with suitable laterally opposed grip members 59. A fuel supply tank 60 is mounted on the operating motor 27 to shift with the latter during the operation of the cam mechanism 35. The driving pulley of the motor is covered by a suitable cover guard 61, which latter also encloses the bearing housing 6. The upper end of the axle stem 20 projects through the cover guard and the latter is secured in position by a nut 62 engaged on said projecting end of the axle stem.

The operating motor 27 is preferably governor-controlled so that the rotating speed of the motor shaft 28 remains constant regardless of whether the motor is operating under no load at all or under full load. In consequence, no fuel control devices of the usual construction and arrangement are provided at the handle 46 of the improved mower. Such governor-controlled type of operating motor even functions effectively to any gravity roll of the mower on down grades, as the travel speed of the mower remains the same under all conditions.

From the foregoing description taken in connection with the accompanying drawings, the construction and method of operation of the invention will be readily apparent to those skilled in the art to which the invention appertains, and it will be evident that the improved mower provides a most efficient device of its kind, which is entirely operated by friction drives, which may be economically constructed, and successfully employed for the purposes and in the manner herein set forth.

What I claim is:

In a power-operated lawn mower including a frame and a drive mechanism including a driving pulley, the combination of a vertically disposed circular hollow cutting head revolubly supported by said frame, said head having a closed top and an open lower end and having the side wall thereof flaring outwardly toward said lower end, a rim track extending around the peripheral edge margin of said top for engagement by said driving pulley, an annular outwardly projecting flange extending around the lower end of said head, a plurality of outwardly projecting cutting elements secured to said flange, a cover shield carried by said frame for covering said head in spaced relation to the latter, a flange formed at the lower end of said shield projecting outwardly beyond the outer free ends of said elements and being disposed above and in close proximity to said elements, and a pair of supporting wheels supported by said frame and being mounted in said head, said supporting wheels being adjustable in said frame for elevating and lowering said supporting wheels in said head.

ROBERT A. GILMOUR.

REFERENCES CITED

The following references are of record in the file of this patent:

UNITED STATES PATENTS

| Number | Name | Date |
|---|---|---|
| 1,819,791 | Reed | Aug. 18, 1931 |
| 1,866,380 | Wagner | July 5, 1932 |
| 1,992,494 | Lundin | Feb. 26, 1935 |
| 2,121,749 | Urschel | June 21, 1938 |
| 2,165,551 | Iverson | July 11, 1939 |
| 2,192,762 | Vincze | Mar. 5, 1940 |
| 2,194,617 | Scott | Mar. 26, 1940 |
| 2,278,922 | Goodall | Apr. 7, 1942 |
| 2,287,126 | Packwood | June 23, 1942 |
| 2,448,074 | Bishop | Aug. 31, 1948 |